United States Patent
Su

(10) Patent No.: US 8,049,774 B2
(45) Date of Patent: Nov. 1, 2011

(54) STEREO IMAGE DEVICE

(75) Inventor: Yu-Tsung Su, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 984 days.

(21) Appl. No.: 11/961,247

(22) Filed: Dec. 20, 2007

(65) Prior Publication Data

US 2009/0079817 A1    Mar. 26, 2009

(30) Foreign Application Priority Data

Sep. 24, 2007 (CN) .......................... 2007 1 0201837

(51) Int. Cl.
*H04N 13/02* (2006.01)
*G06F 15/16* (2006.01)
(52) U.S. Cl. ......................................... 348/47
(58) Field of Classification Search .................... 348/42, 348/47–49
See application file for complete search history.

(56) References Cited

U.S. PATENT DOCUMENTS

| 7,027,082 B2* | 4/2006 | Iida et al. .................... 348/92 |
| 7,587,412 B2* | 9/2009 | Weyl et al. ...................... 1/1 |
| 2002/0057338 A1* | 5/2002 | Fujiwara et al. ................. 348/49 |
| 2004/0090535 A1* | 5/2004 | Watanabe .................. 348/222.1 |
| 2004/0247032 A1* | 12/2004 | Aihara et al. ............ 375/240.16 |
| 2005/0285951 A1* | 12/2005 | Takahashi et al. ....... 348/231.99 |
| 2006/0045514 A1 | 3/2006 | Matsushita et al. |
| 2006/0139751 A1* | 6/2006 | Cha et al. ...................... 359/465 |
| 2007/0297064 A1* | 12/2007 | Watanabe et al. ............. 359/630 |

FOREIGN PATENT DOCUMENTS

JP         11155153 A       6/1999

\* cited by examiner

*Primary Examiner* — Zarni Maung
(74) *Attorney, Agent, or Firm* — Altis Law Group, Inc.

(57) ABSTRACT

A stereo image device includes a first pick-up module for capturing a first image, a second pick-up module for capturing a second image, a controlling unit for dividing the first image into first segments, and the second image into second segments, and choosing odd segments of the first segments as first sub-units, and even segments of the second segments as second sub-units, and combining the first sub-units and the second sub-units in alternate fashion to form a combination image, a display screen for displaying the combination image; and a lens plate covering the display screen, the lens plate including a plane surface facing the display screen, and a lenticular surface opposite the plane surface; the lens plate having a plurality of parallel cylindrical convex lenses on the lenticular surface. A stereo image is formed by seen the combination image through the lens plate.

8 Claims, 5 Drawing Sheets

STEREO IMAGE DEVICE

BACKGROUND

1. Field of the Invention

The present invention relates to stereo image technology, and particularly, to a stereo image device.

2. Description of Related Art

Typically, a stereo image is viewed in two ways. One way is that users (audiences) have to wear special glasses to view images projected on a screen. Another way is that firstly the image is printed, and then the users (audiences) view the printed image via a stereo optical viewing element.

However, in the above mentioned ways, there are problems that 1) it is not convenient for users to wear glasses, and 2) users can't see the stereo image without much prior preparation.

What is needed, therefore, is to provide a stereo image device, with which users can see stereo images conveniently and immediately.

SUMMARY

The present invention relates to a stereo image device. The stereo image device includes a first image pick-up module for capturing a first image of an object, a second image pick-up module for capturing a second image of the object, a controlling unit, a display screen, and a lens plate. The controlling unit divides the first image into a plurality of first strip-like image segments, and divides the second image into a plurality of second strip-like image segments, and chooses odd image segments of the first image segments as first image sub-units, and chooses even image segments of the second image segments as second image sub-units, and combines the first image sub-units and the second sub-units in an alternate fashion to form a combination image. The display screen displays the combination image. The lens plate covers the display screen. The lens plate includes a plane surface facing the display screen, and a lenticular surface opposite the plane surface. The lens plate has a plurality of parallel cylindrical convex lenses on the lenticular surface. Light is received by the two image pick-up modules and a first image and a second image are formed by the two image pick-up modules respectively, and a stereo image is formed by seen by a user viewing the combination image through the lens plate.

Other advantages and novel features of the present invention will become more apparent from the following detailed description of present embodiments when taken in conjunction with the accompanying drawings, in which:

DETAILED DESCRIPTION OF THE EMBODIMENT

Reference will now be made to the figures to describe the at least one present embodiment in detail.

Figure 1:
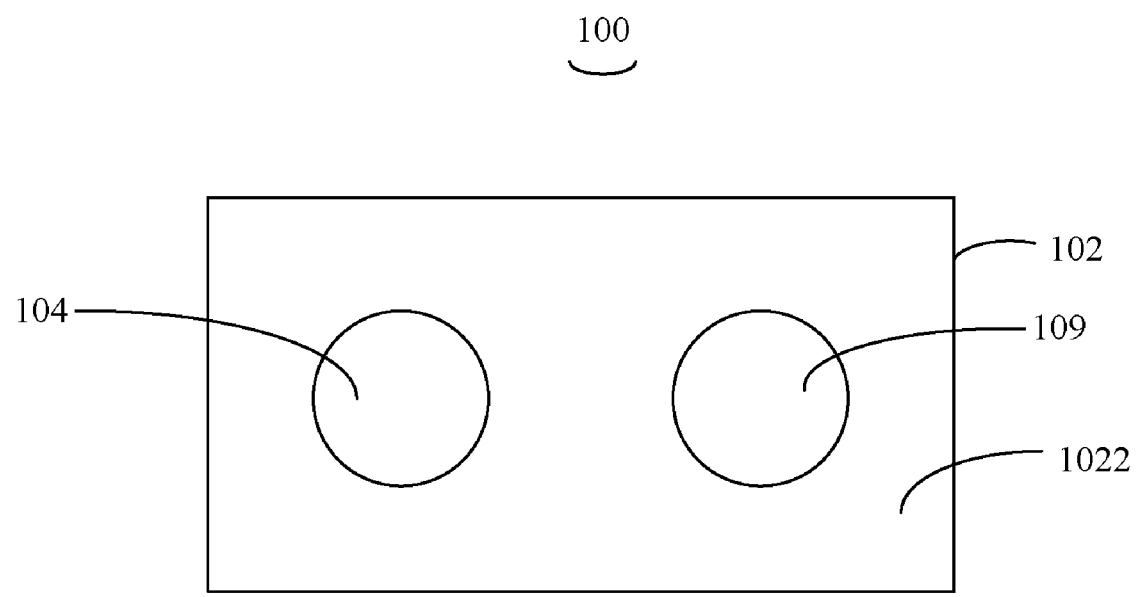
FIG. 1 is a front elevational view of a stereo image device in accordance with a present embodiment.
Figure 2:
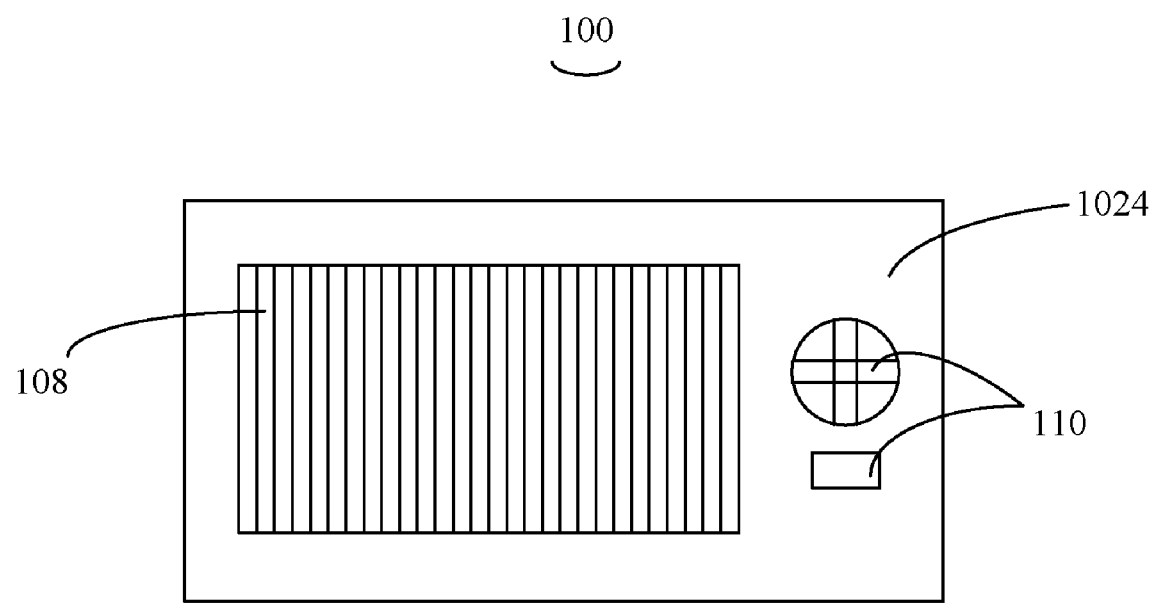
FIG. 2 is a rear elevational view thereof.
Figure 3:
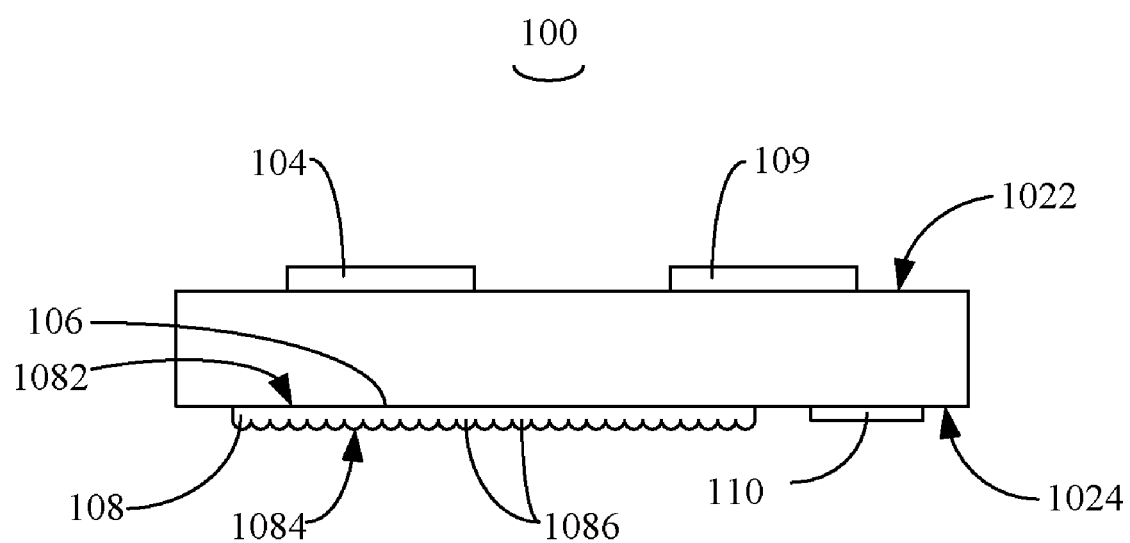
FIG. 3 is a top plan view thereof.
Figure 4:
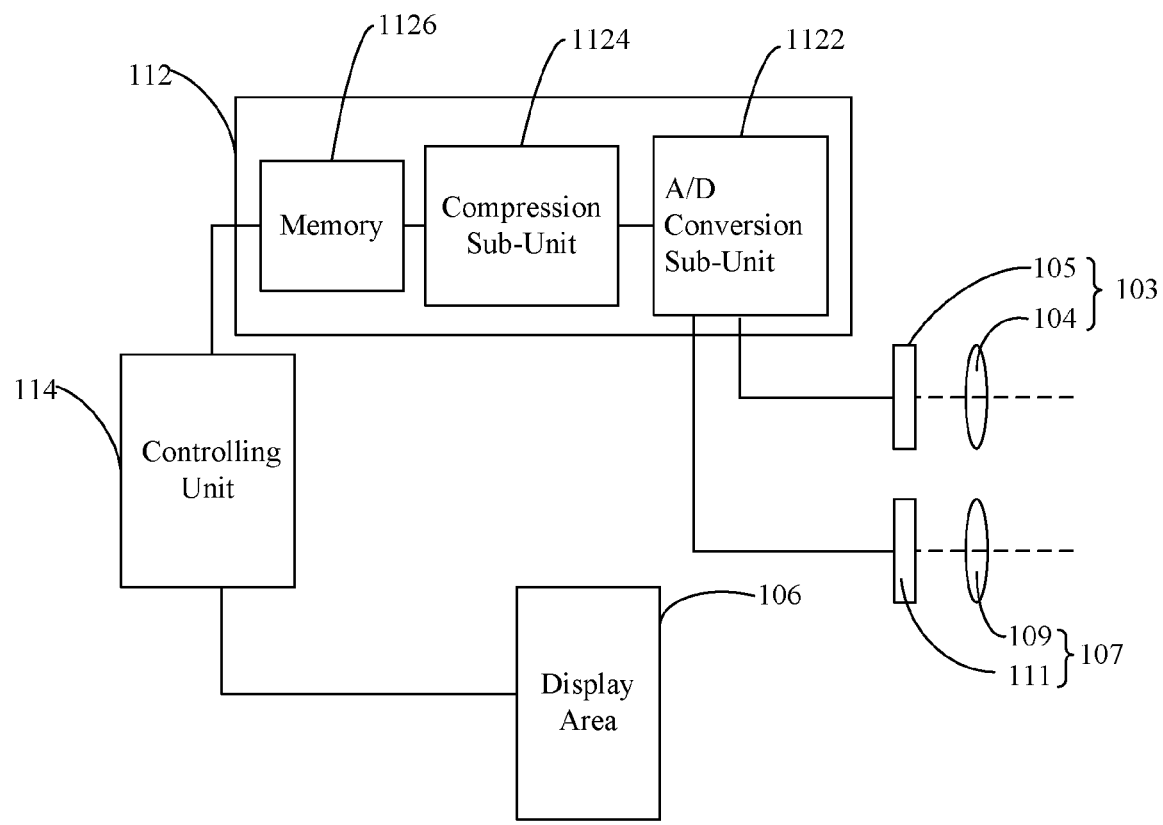
FIG. 4 shows functional modules of the stereo image device of FIG. 1.

Referring to FIGS. 1-4, a stereo image device 100, in accordance with a present embodiment, is shown. The stereo image device 100 includes a body 102, a first image pick-up module 103, a second image pick-up module 107, a display screen 106, a lens plate 108, and a plurality of keys 110. Users operate the stereo image device 100 by pressing the keys 110 to take, save, delete, preview, set, and edit pictures. The first image pick-up module 103 includes a first lens module 104 and an first image sensor 105, and the second image pick-up module 107 includes a second lens module 109 and an second image sensor 111, as shown in FIG. 4.

The body 102 includes a front surface 1022 away from the users and a rear surface 1024 facing the users. The first lens module 104 and the second lens module 109 are positioned in the front surface 1022 and both are threadingly engaged with the body 102. The first lens module 104 and the second lens module 109 move relative to the body 102 to zoom in/out. Beneficially, a distance between two optical axes of the first lens module 104 and the second lens module 109 is 60 millimeters. The first image sensor 105 and the second image sensor 111 are received in the body 102. A center of a sensing area of each of the first and second image sensors is aligned with a corresponding optical axis of each of the first and second lens modules for better image quality. Each of the first and second image sensors includes a charge coupled device (CCD) or a complementary metal-oxide semiconductor (CMOS) to produce images by converting the light (light signals) into electrical signals (analog signals).

The stereo image device 100 further includes an image processing unit 112. The image processing unit 112 is configured for receiving the analog signals. The image processing unit 112 includes an analog-to-digital (A/D) conversion sub-unit 1122, a compression sub-unit 1124, and a memory 1126. The A/D conversion sub-unit 1122 receives the analog signals from the image sensor 105 and converts the analog signals to digital signals. The compression sub-unit 1124 receives the digital signals, and compresses and codes the digital signals to image data such as joint photographic experts group (JPEG) image data. The image data is stored in the memory 1126.

The display screen 106 is a display screen of a liquid crystal display (LCD), and lies on the rear surface 1024 of the body 102. Images captured by the first and the second image sensors are shown in the display screen 106 immediately. Generally, the display screen 106 is of a rectangular configuration.

The lens plate 108 covers the display screen 106, i.e., an orthographic projection of the lens plate 108 on display screen 106 covers the display screen 106. The lens plate 108 includes a plane surface 1082 and a lenticular surface 1084 opposite the plane surface 1082. The plane surface 1082 faces the display screen 106 as shown in FIG. 3. The lens plate 108 has a plurality of parallel cylindrical convex lenses 1086 on the lenticular surface 1084. A width of each of the convex-lenses 1086 is same and is approximately 0.3 millimeters (mm). It is to be understood that other widths (i.e., not just 0.3) could be set according to practical use, and still be within the scope of the present embodiment.

The stereo image device 100 further includes a controlling unit 114. The controlling unit 114 is a chip or the like capable of determining, controlling, computing, executing, dividing, combining etc. The controlling unit 114 processes image data stored in the memory 1126 and shows images on the display screen 106.

A detail description of an operation of the stereo image device follows.

Figure 5:
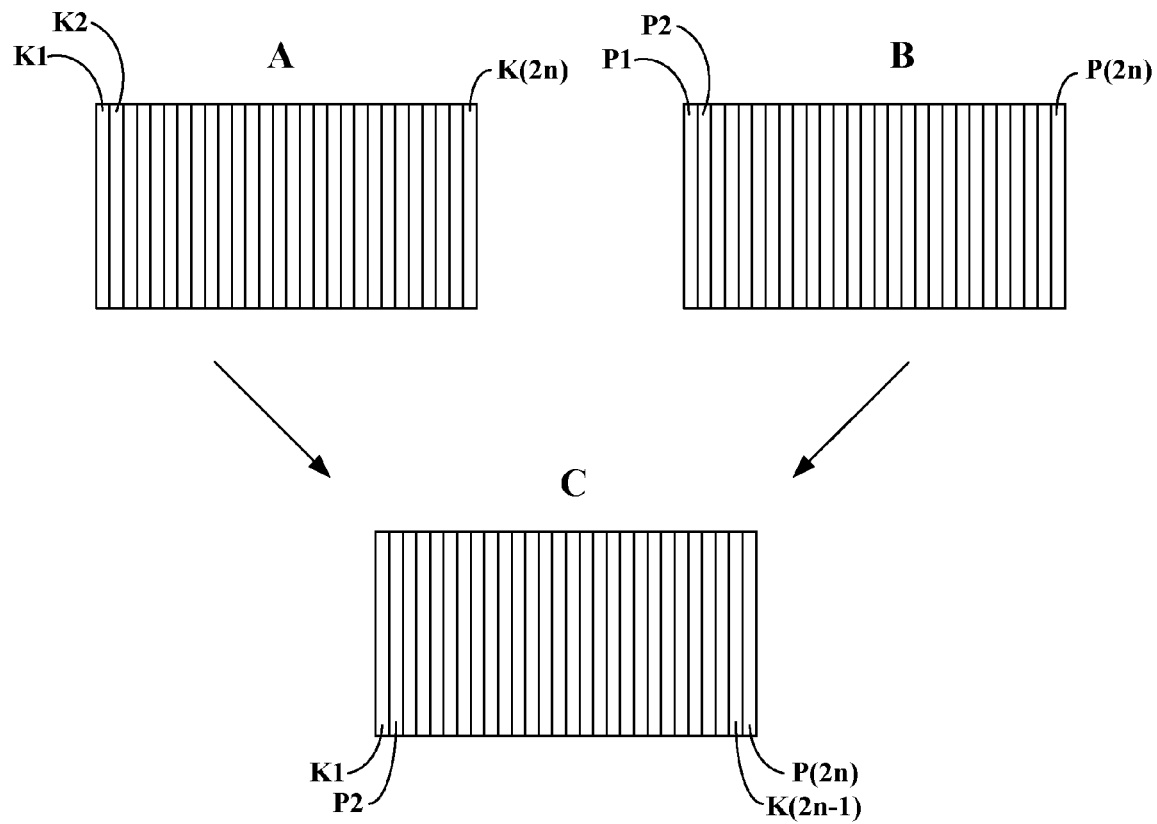
FIG. 5 shows a procedure of image processed by the stereo image device of FIG. 1.

Light incident on the first lens module 104 and the second lens module 109 is sensed by the first image sensor 105 and the second image sensor 111 respectively. the first image sensor 105 and the second image sensor 111 convert the two light signals into two analog signals (hereafter referred to as a first analog signal and a second analog signal). The first and second analog signals are transmitted to the A/D conversion sub-unit 1122, and are converted into a first digital signal and a second digital signal respectively. The compression sub-unit 1124 compresses and codes the first digital signal and the second digital signal to image data such as joint photographic experts group (JPEG) image data. The image data designated as a first image A formed by the first image sensor 105 and a second image B formed by the second image sensor 111 in FIG. 5 are stored in the memory 1126.

The controlling unit 114 reads the first image A and the second image B stored in the memory 1126. Referring to FIG. 5, the first image A is divided into K(2n) first strip-like image segments (n is a natural number), and the second image B is divided into P(2n) second strip-like image segments by the controlling unit 114. Lengthwise directions of the first and second strip-like image segments are parallel to the lengthwise directions of the convex lenses. It is to be understood that the partitioned directions of the first and second images are parallel to extended directions of a line from each eye of the user.

Odd segments of the K(2n) first image segments i.e., K1, K3, K5, ..., K(2n-1) are taken as first image sub-units, and even segments of the P(2n) second image segments i.e., P2, P4, P6, ..., P(2n) are taken as second image sub-units by control unit 114, and combined in alternating fashion (e.g. K1, P2, K3, P4, K5, P6, ... K(2n-1), P(2n)) to form a combination image C. It is to be understood that a resolution of the combination image C is same as that of the first image A or the second image B. A width of each of the K(2n) first strip-like image segments is equal to that of each of the P(2n) second strip-like image segments, and is equal to the width of each of the convex lenses, which is 0.3 mm in the present embodiment.

The controlling unit 114 outputs the combination image C to the display screen 106 where it is displayed. Users see the combination image C on the display screen 106 through the lens plate 108. In this way, users can see a stereo image immediately and conveniently.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A stereo image device, comprising:
a first image pick-up module for capturing a first image of an object;
a second image pick-up module for capturing a second image of the object;
a controlling unit for dividing the first image into a plurality of first strip-like image segments, and dividing the second image into a plurality of second strip-like image segments, and choosing odd image segments of the first image segments as first image sub-units, and choosing even image segments of the second image segments as second image sub-units, and combining the first image sub-units and the second sub-units in an alternate fashion to form a combination image;
a display screen for displaying the combination image; and
a lens plate covering the display screen, the lens plate including a plane surface facing the display screen, and a lenticular surface opposite the plane surface; the
lens plate having a plurality of parallel cylindrical convex lenses on the lenticular surface; light being received by the two image pick-up modules and a first image and a second image being formed by the two image pick-up modules respectively, and a stereo image being formed by seen by a user viewing the combination image through the lens plate.

2. The stereo image device as claimed in claim 1, wherein, a width of each of the convex lenses is 0.3 millimeters.

3. The stereo image device as claimed in claim 2, wherein, a width of each of the first strip-like image segments is equal to that of each of the second strip-like image segments, and is equal to the width of each of the convex lenses; lengthwise directions of the first and second strip-like image segments are parallel to the lengthwise directions of the convex lenses.

4. The stereo image device as claimed in claim 1, wherein each of the first and second image pick-up modules comprises a lens module and an image sensor, and a center of a sensing area of each image sensor is aligned with a corresponding optical axis of each lens module.

5. The stereo image device as claimed in claim 4, wherein the image sensor includes a charge coupled device or a complementary metal-oxide semiconductor.

6. The stereo image device as claimed in claim 4, wherein a distance between two optical axes of the first and second lens modules of the two image pick-up modules is 60 millimeters.

7. The stereo image device as claimed in claim 1, further comprising an image processing unit configured for processing images from the image pick-up module.

8. The stereo image device as claimed in claim 7, wherein the image processing unit comprises:
an analog-to-digital conversion subs-unit for conversing analog signals from the first and second image pick-up modules into digital signals; and
a compression subs-unit for compressing and coding the digital signals to produce image date; and
a memory for storing the image data.

\* \* \* \* \*